United States Patent
Jeong

(10) Patent No.: US 10,222,690 B2
(45) Date of Patent: Mar. 5, 2019

(54) METHOD OF OPTIMIZING A MASK USING PIXEL-BASED LEARNING AND METHOD FOR MANUFACTURING A SEMICONDUCTOR DEVICE USING AN OPTIMIZED MASK

(71) Applicant: Samsung Electronics Co., Ltd., Suwon-si (KR)

(72) Inventor: Moon-Gyu Jeong, Gwangmyeong-si (KR)

(73) Assignee: SAMSUNG ELECTRONICS CO., LTD., Samsung-ro, Yeongtong-gu, Suwon-si, Gyeonggi-do (KR)

(*) Notice: Subject to any disclaimer, the term of this patent is extended or adjusted under 35 U.S.C. 154(b) by 42 days.

(21) Appl. No.: 15/631,763

(22) Filed: Jun. 23, 2017

(65) Prior Publication Data

US 2018/0095359 A1 Apr. 5, 2018

(30) Foreign Application Priority Data

Sep. 30, 2016 (KR) .................. 10-2016-0126577

(51) Int. Cl.
*G06F 17/50* (2006.01)
*G03F 1/36* (2012.01)
(Continued)

(52) U.S. Cl.
CPC ............ *G03F 1/36* (2013.01); *G03F 7/705* (2013.01); *G03F 7/70091* (2013.01);
(Continued)

(58) Field of Classification Search
CPC ............ G06F 17/5081; G06F 17/5009; G06F 2217/12; G06F 2217/06; G06F 17/14;
(Continued)

(56) References Cited

U.S. PATENT DOCUMENTS 8,458,623 B1* 6/2013 Wagner ................. G03F 1/36
716/51
9,360,766 B2 6/2016 Ye et al.
(Continued)

FOREIGN PATENT DOCUMENTS

JP 2015-105897 A 6/2015
KR 2016-0007630 A 1/2016

OTHER PUBLICATIONS

Sabatier, R.; Fossati, C.; Bourennane, S.; and Di Giacomo, A., "Fast approximation of transfer cross coefficient for optical proximity correction," Optics Express, Optical Society of America, vol. 16, No. 19, Sep. 15, 2008, pp. 15249-15253 (5 pages).
(Continued)

*Primary Examiner* — Phallaka Kik
(74) *Attorney, Agent, or Firm* — Muir Patent Law, PLLC

(57) ABSTRACT

A mask optimization method for optimizing a target mask used for a partial coherent system including a plurality of spatial filters is provided. The mask optimization method includes obtaining a trainer mask that is an optimized sample mask by performing a mask optimization on a sample mask, generating a mask optimization estimation model by performing a pixel-based learning using, as a feature vector of each of pixels of the trainer mask, partial signals of each of the pixels of the trainer mask respectively determined based on the spatial filters and using, as a target value, a degree of overlap between each of the pixels and a mask polygon of the trainer mask, and performing a mask optimization on the target mask using the mask optimization estimation model.

20 Claims, 14 Drawing Sheets

(51) Int. Cl.
*G03F 7/20* (2006.01)
*G06F 17/14* (2006.01)
*G21K 5/00* (2006.01)

(52) U.S. Cl.
CPC .......... *G03F 7/70441* (2013.01); *G06F 17/14* (2013.01); *G06F 17/5081* (2013.01); *G03F 7/7085* (2013.01); *G06F 17/5009* (2013.01); *G06F 2217/12* (2013.01); *G21K 5/00* (2013.01)

(58) Field of Classification Search
CPC .... G03F 1/36; G03F 7/70091; G03F 7/70441; G03F 7/705; G03F 7/7085; G21K 5/00
USPC ........... 716/53, 54, 55, 136; 378/35; 700/98, 700/110, 120, 121; 430/5
See application file for complete search history.

(56) References Cited

U.S. PATENT DOCUMENTS

2007/0134560 A1* 6/2007 Dirksen .............. G03F 7/70291
430/5
2007/0288219 A1* 12/2007 Zafar .................. G03F 1/84
703/14
2010/0136549 A1* 6/2010 Christiansen ......... G06T 7/0012
435/6.1
2012/0008134 A1* 1/2012 Azpiroz .................. G03F 1/36
356/73
2012/0314910 A1* 12/2012 Arnz ................ G03F 7/70633
382/107
2013/0159943 A1 6/2013 Agarwal et al.
2016/0170311 A1 6/2016 Schmitt-Weaver et al.
2016/0335753 A1 11/2016 Sezginer et al.
2017/0038674 A1 2/2017 Jeong

OTHER PUBLICATIONS

Yu, B.; Gao, J.-R.; Ding, D.; Zeng. X.; and Pan, D.Z., "Accurate lithography hotspot detection based on principal component analysis-support vector machine classifier with hierarchical data clustering," Journal of Micro/Nanolithography, MEMS, and MOEMS, vol. 14, No. 1, Jan.-Mar. 2015, pp. 011003-1-011003-12 (13 pages).
Ma, X.; Wu, B.; Song, Z.; Jiang, S.; and Li, Y., "Fast pixel-based optical proximity correction based on nonparametric kernel regression," Journal of Micro/Nanolithography, MEMS, and MOEMS, vol. 13, No. 4, Oct.-Dec. 2014, pp. 043007-1-043007-11 (12 pages).

* cited by examiner

METHOD OF OPTIMIZING A MASK USING PIXEL-BASED LEARNING AND METHOD FOR MANUFACTURING A SEMICONDUCTOR DEVICE USING AN OPTIMIZED MASK

CROSS-REFERENCE TO RELATED APPLICATION

This application claims priority under 35 U.S.C. § 119 to Korean Patent Application No. 10-2016-0126577, filed on Sep. 30, 2016, in the Korean Intellectual Property Office, the disclosure of which is hereby incorporated by reference in its entirety.

BACKGROUND

Technical Field

Example embodiments of the present disclosure relate to a semiconductor manufacturing process, more specifically, to a method of optimizing a mask included in a partial coherent system using a pixel-based learning.

Discussion of the Related Art

An optical lithography process is performed to form a circuit pattern corresponding to mask polygons of a mask on a substrate (e.g., a silicon wafer). In the optical lithography process, light is irradiated through the mask onto the substrate coated with the photoresist. A desired circuit pattern is formed on the substrate by an optical lithography process using a mask having a mask pattern (or an image pattern). The mask pattern can include mask polygons corresponding to the desired circuit pattern.

As the integration of a semiconductor device increases, the distance between the mask polygons decreases and the width of each mask polygon becomes narrower. Such proximity can cause interference and diffraction of light, and thus a distorted circuit pattern different from the desired circuit pattern can be printed on the substrate.

A resolution enhancement technique for optimizing the mask includes, for example, optical proximity correction, an assist feature method or an inverse lithography technique. The resolution enhancement technique can be used for preventing a distorted circuit pattern. However, in the resolution enhancement technique, multiple simulations are performed.

SUMMARY

In some embodiments, the disclosure is directed to a method of optimizing a target mask used for a partial coherent system having a plurality of spatial filters, the method comprising: obtaining a trainer mask that is an optimized sample mask by performing a mask optimization on a sample mask; generating a mask optimization estimation model by performing a pixel-based learning using, as a feature vector of each of pixels of the trainer mask, partial signals of each of the pixels of the trainer mask respectively determined based on the plurality of spatial filters and using, as a target value, a degree of overlap between each of the pixels and a mask polygon of the trainer mask; and performing a mask optimization on the target mask using the mask optimization estimation model.

In some embodiments, the disclosure is directed to a method of optimizing a target mask used for a partial coherent system having a plurality of spatial filters, the method comprising: obtaining a trainer mask that is an optimized sample mask by performing a mask optimization on a sample mask; obtaining a grey scale value of each of pixels of the trainer mask representing a degree of overlap between a mask polygon of the trainer mask and each of the pixels of the trainer mask by performing a grey scale rasterization on the trainer mask; obtaining a feature vector of each of the pixels of the trainer mask by calculating partial signals of each of the pixels of the trainer mask based on the plurality of spatial filters; generating a mask optimization estimation model by performing a pixel-based learning using the feature vector of each of the pixels of the trainer mask and using the grey scale value of each of the pixels of the trainer mask as a target value of each of the pixels of the trainer mask; and performing a mask optimization on the target mask using the mask optimization estimation model.

In some embodiments, the disclosure is directed to a method of optimizing a target mask used for a partial coherent system having a plurality of spatial filters, the method comprising: obtaining a trainer mask by performing a mask optimization on a sample mask; obtaining a grey scale value for each pixel of the trainer mask, wherein the grey scale value represents a degree of overlap between a mask polygon of the trainer mask and the pixel of the trainer mask; obtaining, for each pixel of the trainer mask, a feature vector of the pixel by calculating a partial signal of the pixel based on a corresponding one of the plurality of spatial filters; generating a mask optimization estimation model by performing, for each pixel of the trainer mask, a pixel-based learning using the partial signal of the pixel as a feature vector and the grey scale value of the pixel as a target value; and performing a mask optimization on the target mask using the mask optimization estimation model.

DETAILED DESCRIPTION OF THE EMBODIMENTS

Various example embodiments will now be described more fully with reference to the accompanying drawings in which some example embodiments are shown. However, the concepts may be embodied in many alternate forms and should not be construed as limited to only example embodiments set forth herein.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

As discussed herein, an integrated circuit device may refer to a semiconductor device, a flat panel display, or other electronic device being manufactured. As used herein, a semiconductor device may refer, for example, to a device such as a semiconductor chip (e.g., memory chip and/or logic chip formed on a die), a stack of semiconductor chips, a semiconductor package including one or more semiconductor chips stacked on a package substrate, or a package-on-package device including a plurality of packages. These devices may be formed using ball grid arrays, wire bonding, through substrate vias, or other electrical connection elements, and may include memory devices such as volatile or non-volatile memory devices. An integrated circuit device may include, for example, a substrate having an integrated circuit thereon, such as a wafer, or a plurality of semiconductor devices formed in an array on a wafer.

An electronic device, as used herein, may refer to these semiconductor devices or integrated circuit devices, and may additionally include products that include these devices, such as a memory module, memory card, hard drive including additional components, or a mobile phone, laptop, tablet, desktop, camera, or other consumer electronic device, etc.

Figure 1:
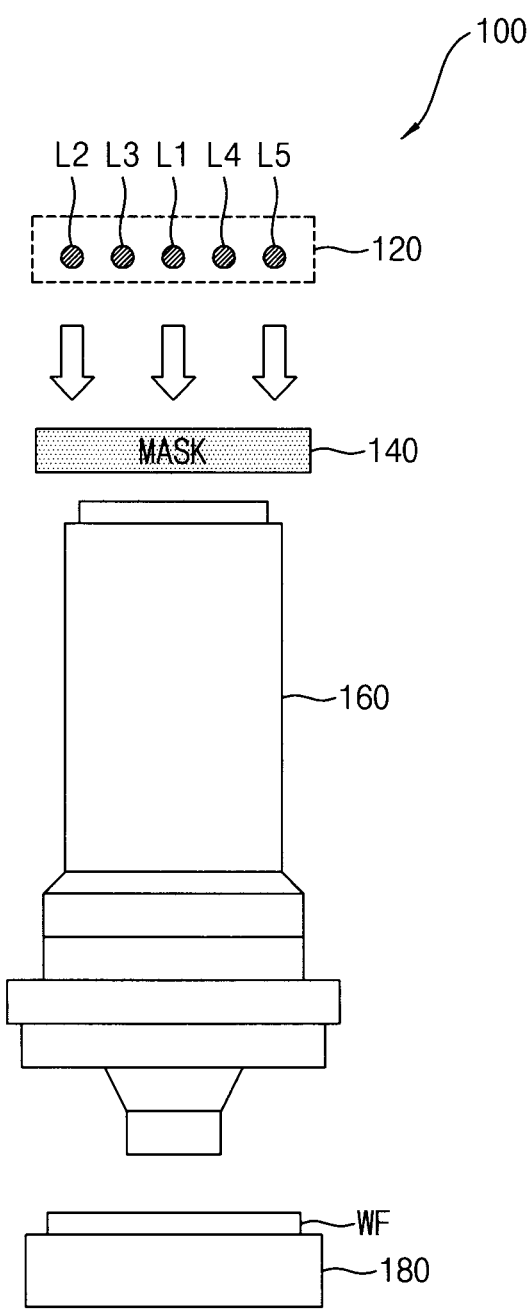
FIG. 1 is a view illustrating a partial coherent system including a mask on which a mask optimization method is performed according to example embodiments.

FIG. 1 is a view illustrating a partial coherent system including a mask on which a mask optimization method is performed according to example embodiments.

Referring to FIG. 1, a partial coherent system 100 including a mask 140 on which a mask optimization method is performed may be an optical lithography system for printing a circuit pattern on a wafer WF using the mask 140. The partial coherent system 100 may include a plurality of point light sources 120, the mask 140, a reduction projection apparatus 160 and a wafer stage 180. However, the partial coherent system 100 may further include components that are not illustrated in FIG. 1. For example, the partial coherent system 100 may further include at least one sensor configured to measure a height and an inclination of a surface of the wafer WF.

The partial coherent system 100 may include the point light sources 120, including, for example, first through fifth point light sources L1, L2, L3, L4 and L5. The first through fifth point light sources L1, L2, L3, L4 and L5 may each emit light. The light emitted from each of the first through fifth point light sources L1, L2, L3, L4 and L5 may be provided to or illuminated onto the mask 140. For example, the first through fifth point light sources L1, L2, L3, L4 and L5 may each include an ultraviolet (UV) light source a krypton fluoride (KrF) light source having a wave length of 234 nm or an argon fluoride (ArF) light source having a wave length of 193 nm. Each of the first through fifth point light sources L1, L2, L3, L4 and L5 may emit light having a same or different intensity. The point light sources 120 may include five point light sources L1, L2, L3, L4 and L5 as shown in FIG. 1. However, the number of the point light sources 120 may be variously changed according to example embodiments. For example, the point light sources 120 may include a dipole light source or a quadruple light source, but are not limited thereto.

In some embodiments, the partial coherent system 100 may include a lens disposed between the point light sources 120 and the mask 140 to adjust an optical focus.

The mask 140 may include mask patterns including mask polygons corresponding to a circuit pattern or a device pattern, for example, an interconnection pattern, a contact pattern or a gate pattern to print the circuit pattern or the device pattern on the wafer WF. Mask polygons may be, for example, bitmaps or polygon layers that identify specific areas upon which further processing is to be performed. In some embodiments, the mask polygons of the mask 140 may be a transparent region capable of passing the light emitted from the point light sources 120, and the other region of the mask 140 except the mask polygons may be an opaque region. In other embodiments, the mask polygons of the mask 140 may be the opaque region, and the other region of the mask 140 except the mask polygons may be the transparent region. The mask 140 may be optimized by a mask optimization method according to example embodiment, which is described with reference with FIGS. 4 through 13.

The reduction projection apparatus 160 may be provided with the light that passes through the transparent region of the mask. For example, light that passes through the transparent region of the mask may be directed through the reduction projection apparatus 160. The reduction projection apparatus 160 may match the circuit pattern to be printed on the wafer WF with the mask pattern of the mask 140. The wafer stage 180 may support the wafer WF. For example, the wafer stage 180 may provide the base upon which the wafer WF rests and against which the wafer WF is held while the circuit pattern is printed on the wafer WF. The reduction projection apparatus 160 may include an aperture to increase depth of focus of the light (e.g., UV light) emitted from the point light sources 120. The aperture may have different optical characteristics according to positions of the first through point light sources L1, L2, L3, L4 and L5 with respect to one another (e.g., the first through point light sources L1, L2, L3, L4 and L5), and thus the partial coherent system 100 may include a plurality of spatial filters. For example, the partial coherent system 100 may have, as the spatial filters, a plurality of point spread functions or mathematical transformations thereof. An optical characteristic of the partial coherent system 100 are described with reference to FIGS. 2 and 3.

A region of the mask 140 corresponding to the mask polygons (or a region except the mask polygons when the mask polygons are the opaque region) may pass the light emitted from the point light sources 120. The light passing through the mask 140 may be irradiated onto the wafer WF through the reduction projection apparatus 160. Thus, the circuit pattern or the device pattern corresponding to the mask polygons of the mask 140 may be printed on the wafer WF.

With increasing integration of a semiconductor device, a distance between the mask polygons may be reduced, and a width of each of the mask polygons may become narrower. Due to such proximity, interference and diffraction of the light may be generated, and thus a distorted circuit pattern different from a desired circuit pattern may be printed on the wafer WF. When the distorted circuit pattern is printed on the wafer WF, a manufactured electronic circuit may operate abnormally.

A resolution enhancement technique for optimizing the mask 140, such as optical proximity correction, an assist feature method, or an inverse lithography technique, may be used to prevent such a distorted circuit pattern. The resolution enhancement technique may be performed using multiple simulations, and the multiple simulations may take more time for the mask optimization as compared with a single simulation.

In the mask optimization method according to example embodiments, a pixel-based learning may be performed using a trainer mask on which a mask optimization is performed by the resolution enhancement technique to generate a mask optimization estimation model. The mask optimization may be performed on a target mask (i.e., the mask 140) using the mask optimization estimation model, and thus mask optimization for the target mask may be quickly and efficiently performed compared to the resolution enhancement technique for optimizing the mask 140.

Figure 2:
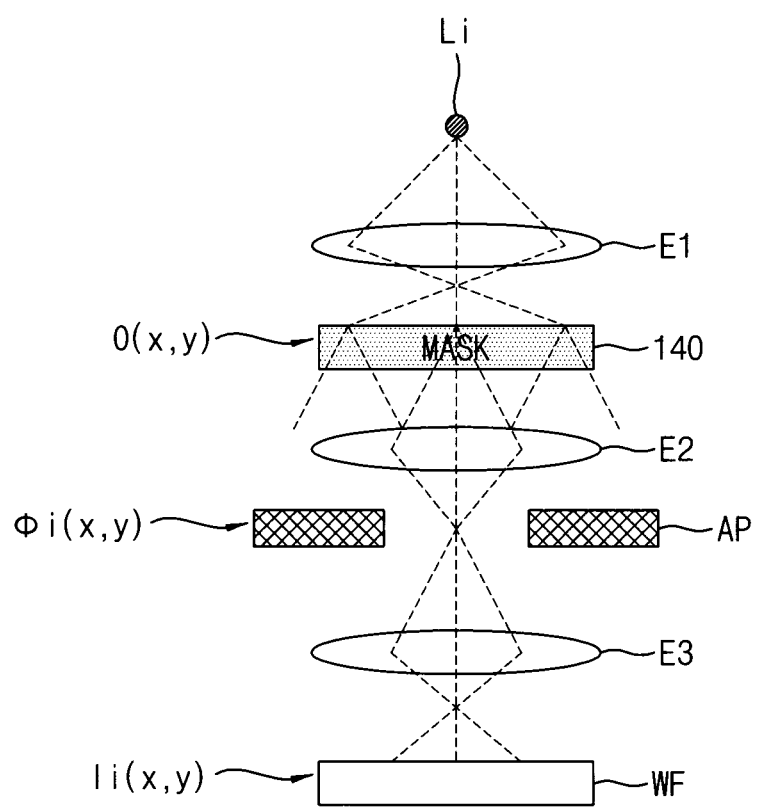
FIG. 2 is a view illustrating an optical characteristic of the partial coherent system of FIG. 1 according to example embodiments.
Figure 3:
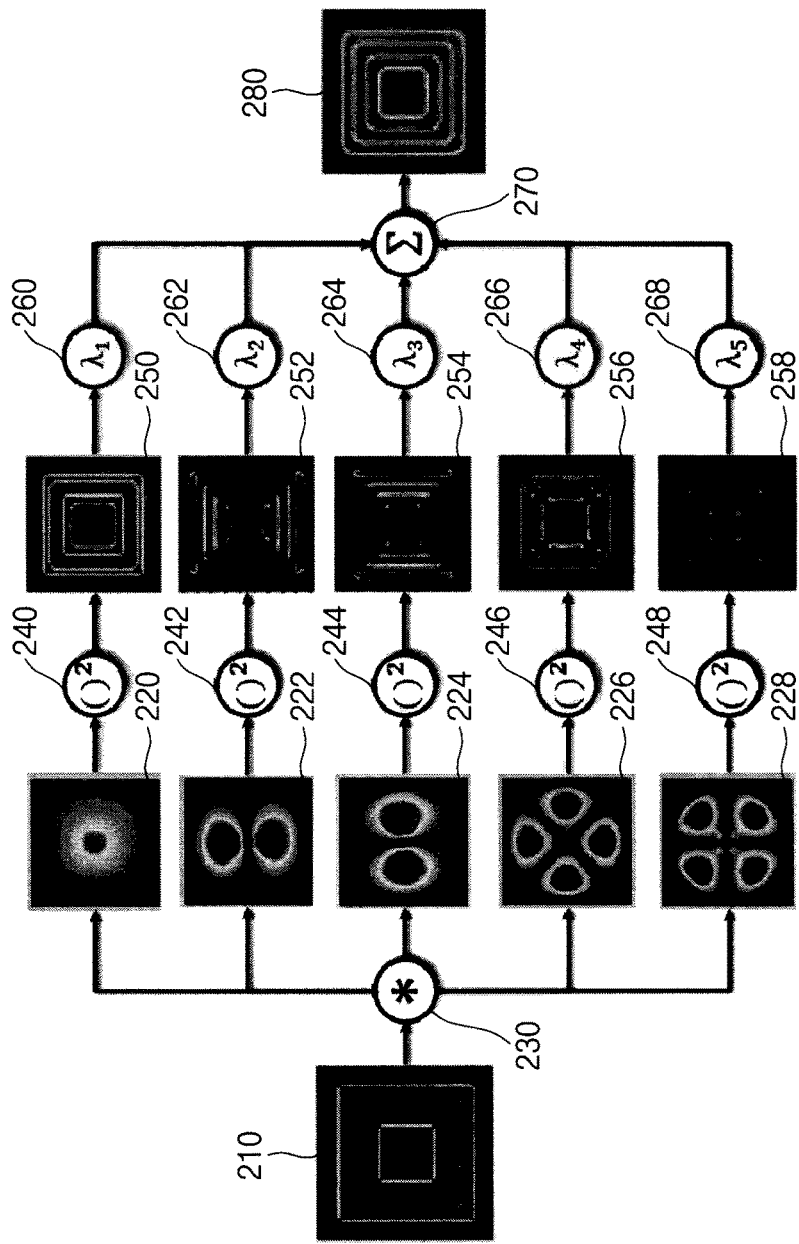
FIG. 3 is a view illustrating an intensity of light irradiated onto a substrate by the partial coherent system of FIG. 1 according to example embodiments.

FIG. 2 is a view illustrating an optical characteristic of the partial coherent system of FIG. 1 according to example embodiments. FIG. 3 is a view illustrating an intensity of light irradiated onto a substrate by the partial coherent system of FIG. 1 according to example embodiments.

Referring to FIG. 2, light emitted from any one point light source Li of the first through fifth point light sources L1, L2, L3, L4 and L5 may be irradiated onto the mask 140. In some embodiments, a first lens E1 for adjusting the optical focus may be provided between the point light source Li and the mask 140. The transparent region of the mask 140 may pass the light emitted from the point light source Li, and the opaque region of the mask 140 may block the light emitted from the point light source Li.

In some embodiments, an optical characteristic of the mask 140 in a space domain may be mathematically modeled in a mask function "O(x,y)" having a value "1" for a region of the mask polygons (e.g., the transparent region) and a value "0" for a region except the mask polygons (e.g., the opaque region). Here, "x" may be a coordinate in a first direction (e.g., a horizontal direction) on a plane (e.g., a wafer plane or a mask plane) and "y" may be a coordinate in a second direction (e.g., a vertical direction) vertical to the first direction on the plane (e.g., the wafer plane or the mask plane). The mask function "O(x,y)" that is a mathematical model representing the optical characteristic of the mask 140 may be referred to as an "object function". For example, the mask function (or the object function) may have a value "1" (i.e., O(x,y)=1) for the transparent region and a value "0" (i.e., O(x,y)=0) for the opaque region. The mask function (or the object function) may denote a position where the mask 140 may pass or block the light.

The reduction projection apparatus 160 of FIG. 1 may include second and third lenses E2 and E3 for adjusting optical focus and an aperture AP to increase depth of focus. The light passing through the transparent region of the mask 140 may be illuminated onto the wafer WF through the second lens E2, the aperture AP and the third lens E3.

The aperture AP may include a passing region that may pass the light and a blocking region that may block the light. Thus, the aperture AP may have an optical characteristic capable of passing or blocking the light. In some embodiments, the optical characteristic of the aperture AP in the space domain may be mathematically modeled in a function "$\varphi_i(fx,fy)$" that has a value "1" for the passing region and a value "0" for the blocking region. Herein, "i" may be an index relative to the point light source Li. Thus, for example, the optical characteristic of the aperture AP with respect to the first point light source L1 may be expressed by "$\varphi_1(fx,fy)$", where "fx" represents a frequency in the first direction (e.g., the horizontal direction) and "fy" represents a frequency in the second direction (e.g., the vertical direction). The function "$\varphi_i(fx,fy)$" may be a mathematical model representing the optical characteristic of the aperture AP in the space domain and may be referred to as a "pupil function". The pupil function may denote a position where the aperture AP may pass or block the light.

The aperture AP may have different optical characteristics depending on a position of the point light source Li. For example, a path of the light emitted from the second point light source L2 of FIG. 1 may be different from a path of the light emitted from the first light source L1 of FIG. 1, and thus the optical characteristic of the aperture AP caused by the light emitted from the second point light source L2 may be different from the optical characteristic of the aperture AP caused by the light emitted from the first point light source L1. The pupil function "$\varphi_1(fx,fy)$" representing the optical characteristic of the aperture AP based on the first point light source L1 may have a different value from the pupil function "$\varphi_2(fx,fy)$" representing the optical characteristic of the aperture AP based on the second point light source L2. For example, when an optical environment based on the second point light source L2 is observed in terms of the first point light source L1, the passing region of the aperture AP may be shifted to the side of the aperture AP. Even if the same aperture AP is used, the optical characteristic of the aperture AP may seem to be changed when the position of the point light source Li is changed. The pupil function representing the optical characteristic of the aperture AP may vary depending on the position of the point light source Li.

The light emitted from the point light source Li may pass through the mask 140 and the aperture AP and may be illuminated onto the wafer WF. The light emitted from the point light source Li may be irradiated onto a region corresponding to the mask polygons of the mask 140 (or the other region of except the mask polygons), and thus the circuit pattern (or the device pattern) corresponding to the mask polygons may be printed on the wafer WF. An intensity of the light irradiated onto the wafer WF may be expressed by the following Equation 1.

$$I(x, y) = \sum_{i=1}^{N} \lambda_i |O(x, y) * \Phi_i(x, y)|^2 \quad \text{[Equation 1]}$$

In the above Equation 1, "I(x,y)" may represent the intensity of the light irradiated onto the wafer WF, "O(x,y)" may represent the mask function (or the object function), and "$\Phi_i(x,y)$" may represent a "spatial filter" obtained by performing a Fourier transform on the pupil function "$\varphi_i$(fx,fy)". As described above, "x" may be a coordinate in the horizontal direction on the plane, and "y" may be a coordinate in the vertical direction on the plane. The term "O(x,y)*$\Phi_i$(x,y)" may denote a convolution operation of the mask function and the spatial filter (or a point spread function) corresponding to the i-th point light source Li, and may refer to an optical field generated based on the i-th point light source Li. The square of the optical field may refer to a basis intensity based on the i-th point light source Li. By multiplying the basis intensity by a proper coefficient "$\lambda_i$", the intensity "$I_i$(x,y)" of the light irradiated onto the wafer WF corresponding to the i-th point light source Li may be calculated.

The coefficient "$\lambda_i$" may be obtained by any one of various methods. For example, the coefficient "$\lambda_i$" may be selected to be proportional to the intensity of the point light source Li. The coefficient "$\lambda_i$" may be selected to have a weight value by transforming a calculation space. A singular value decomposition (SVD) technique may be an example of a methodology of transforming the calculation space. A method of obtaining the Equation 1 and the coefficient "$\lambda_i$" may be readily discerned by those skilled in the art, and detailed descriptions thereto are omitted.

The intensity of the light irradiated onto the wafer WF or an image formation in the partial coherent system 100 of FIG. 1 may be expressed as shown in FIG. 3.

Referring to FIG. 3, the mask 140 of FIG. 1 may have an optical characteristic such as a mask function 210. The aperture AP in the partial coherent system 100 may have different pupil functions relative to the first through fifth point light sources L1, L2, L3, L4 and L5. Thus, the partial coherent system 100 may have a plurality of spatial filters 220, 222, 224, 226 and 228 obtained by performing a Fourier transform on the respective pupil functions. The optical lithography system having the spatial filters 220, 222, 224, 226 and 228 may be referred to as the partial coherent system 100. A convolution operation 230 may be performed on the mask function 210 and each of the spatial filters 220, 222, 224, 226 and 228. When square operations ("( )²") 240, 242, 244, 246 and 248 are respectively performed on results of the convolution operation 230, a plurality of basis intensities 250, 252, 254, 256 and 258 may be respectively derived from the point light sources L1, L2, L3, L4 and L5 in the partial coherent system 100. By performing multiplication operations 260, 262, 264, 266 and 268 to multiply the basis intensities 250, 252, 254, 256 and 258 by predetermined coefficients $\lambda_1$, $\lambda_2$, $\lambda_3$, $\lambda_4$ and $\lambda_5$, respectively, intensities of the lights irradiated onto the wafer WF by the point light sources L1, L2, L3, L4 and L5 in the partial coherent system 100 may be derived. By summing 270 the intensities of the lights irradiated onto the wafer WF by the point light sources L1, L2, L3, L4 and L5, a final intensity 280 of the lights irradiated onto the wafer WF may be calculated. The final intensity 280 of the light may correspond to the circuit pattern (or the device pattern) on the wafer WF.

As described above, the partial coherent system 100 may have the spatial filters 220, 222, 224, 226 and 228 representing the optical characteristic. The mask optimization method according to example embodiments may generate the accurate mask optimization estimation model by extracting partial signals corresponding to the spatial filters 220, 222, 224, 226 and 228 in a feature vector and performing the pixel-based learning. Hereinafter, the mask optimization method will be described with reference to FIGS. 4 through 13.

Figure 4:
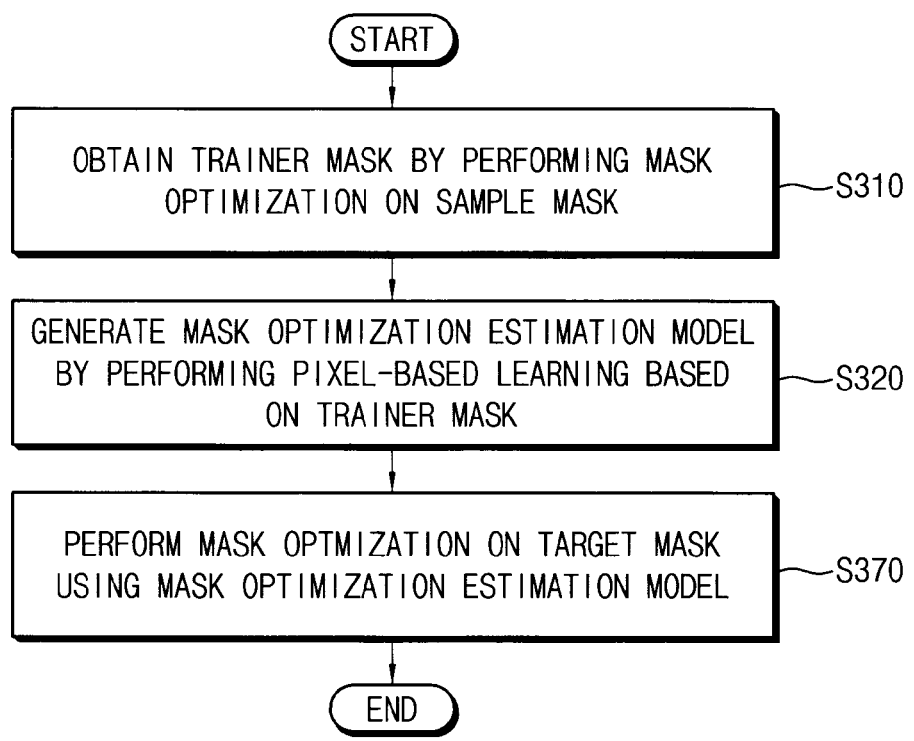
FIG. 4 is a flow chart illustrating a mask optimization method according to example embodiments.
Figure 5:
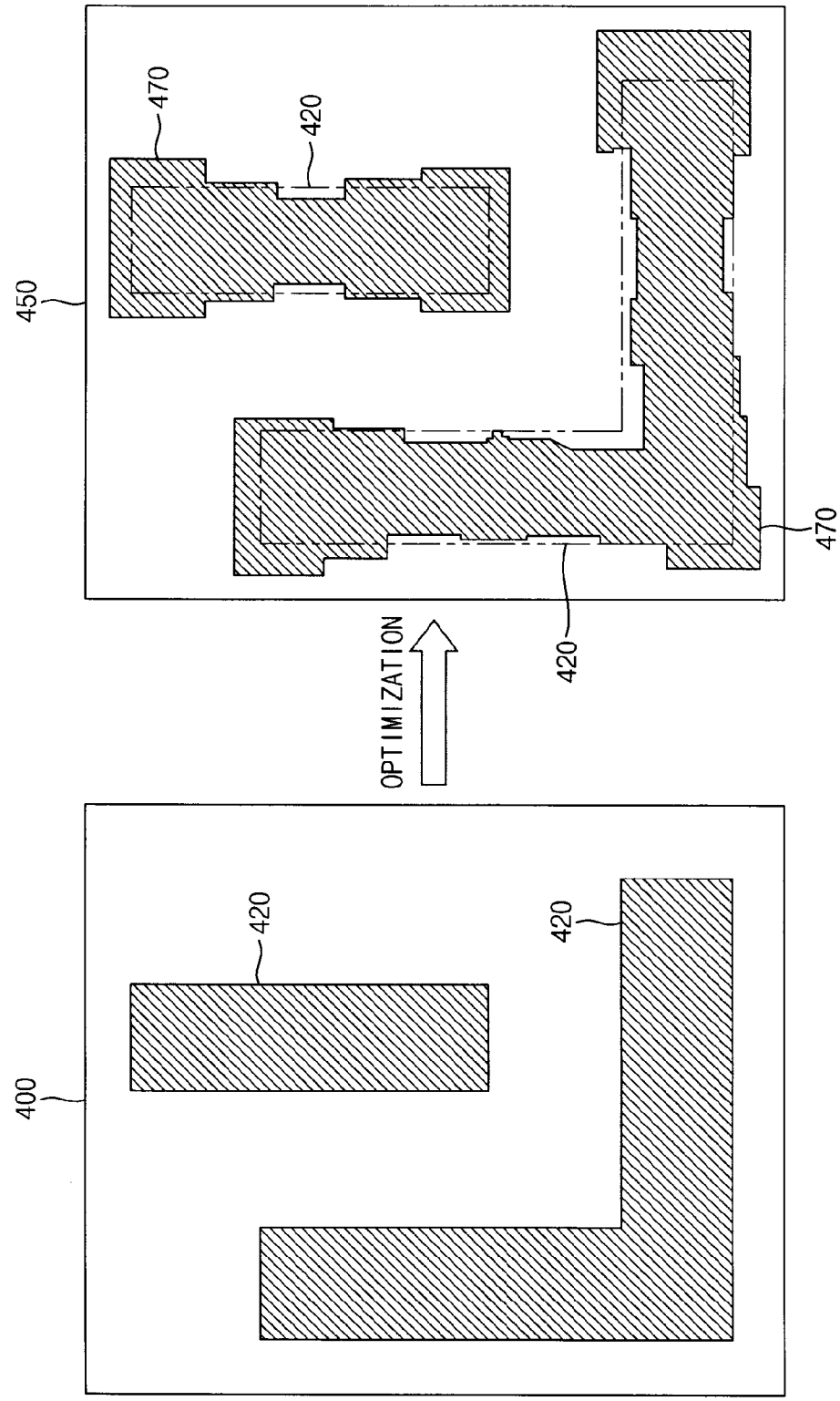
FIG. 5 is a view illustrating an example of a mask optimization method performed on a sample mask in the mask optimization method of FIG. 4 according to example embodiments.
Figure 6:
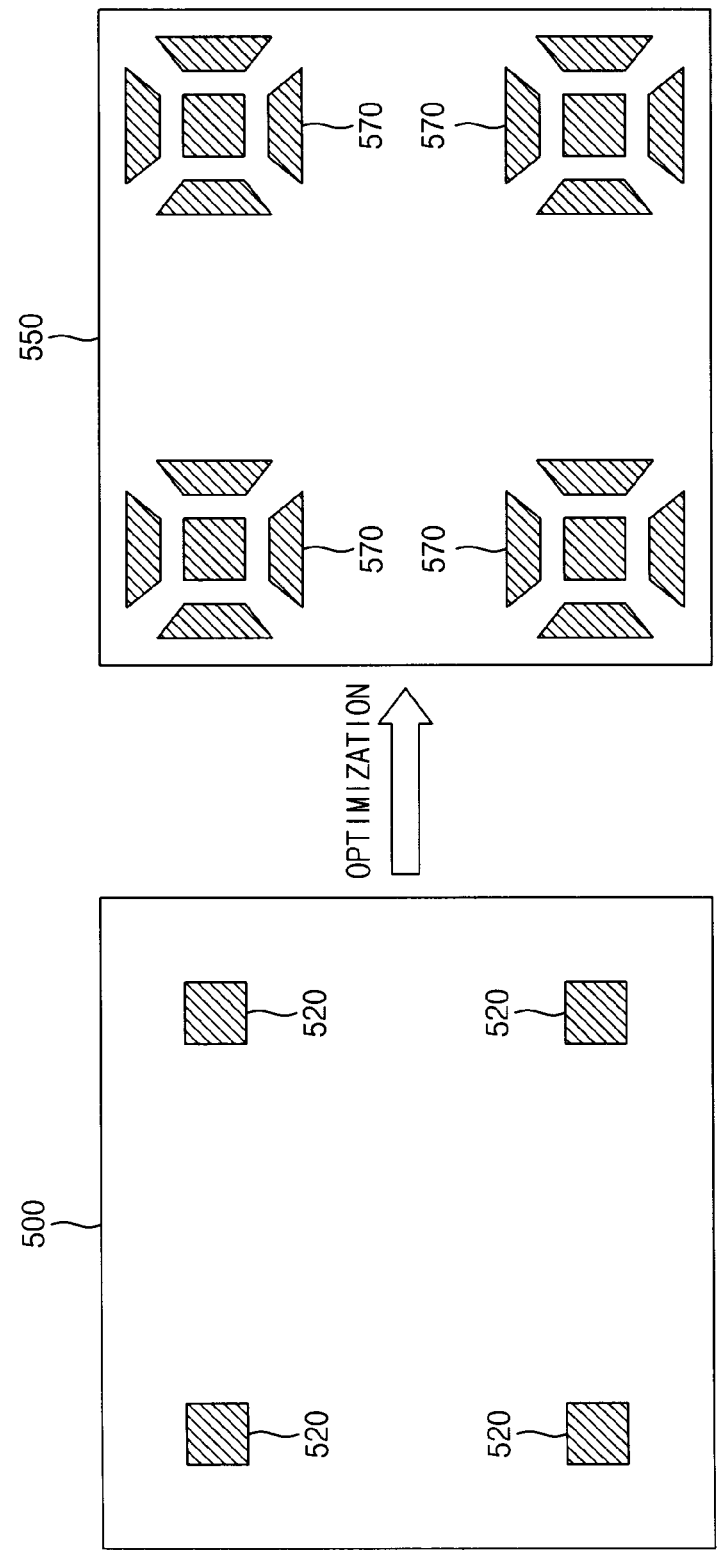
FIG. 6 is a view illustrating another example of a mask optimization method performed on a sample mask in the mask optimization method of FIG. 4 according to example embodiments.
Figure 7:
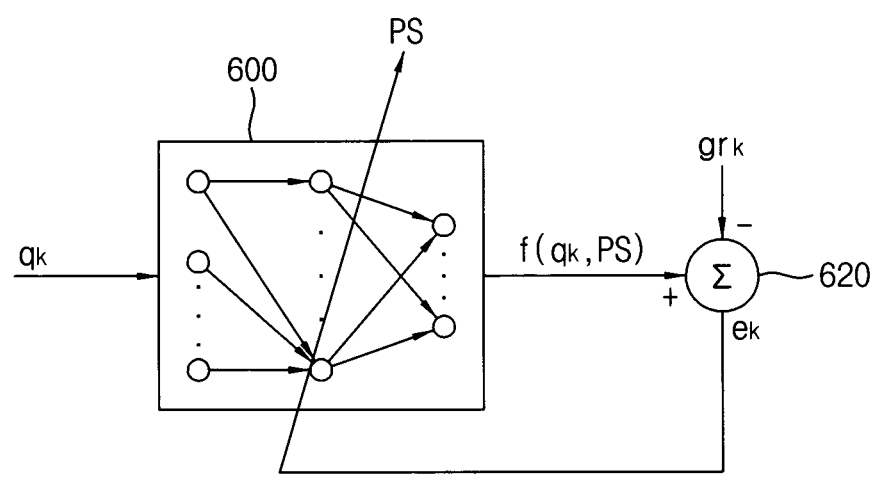
FIG. 7 is a view illustrating a pixel-based learning performed in the mask optimization method of FIG. 4 according to example embodiments.
Figure 8:
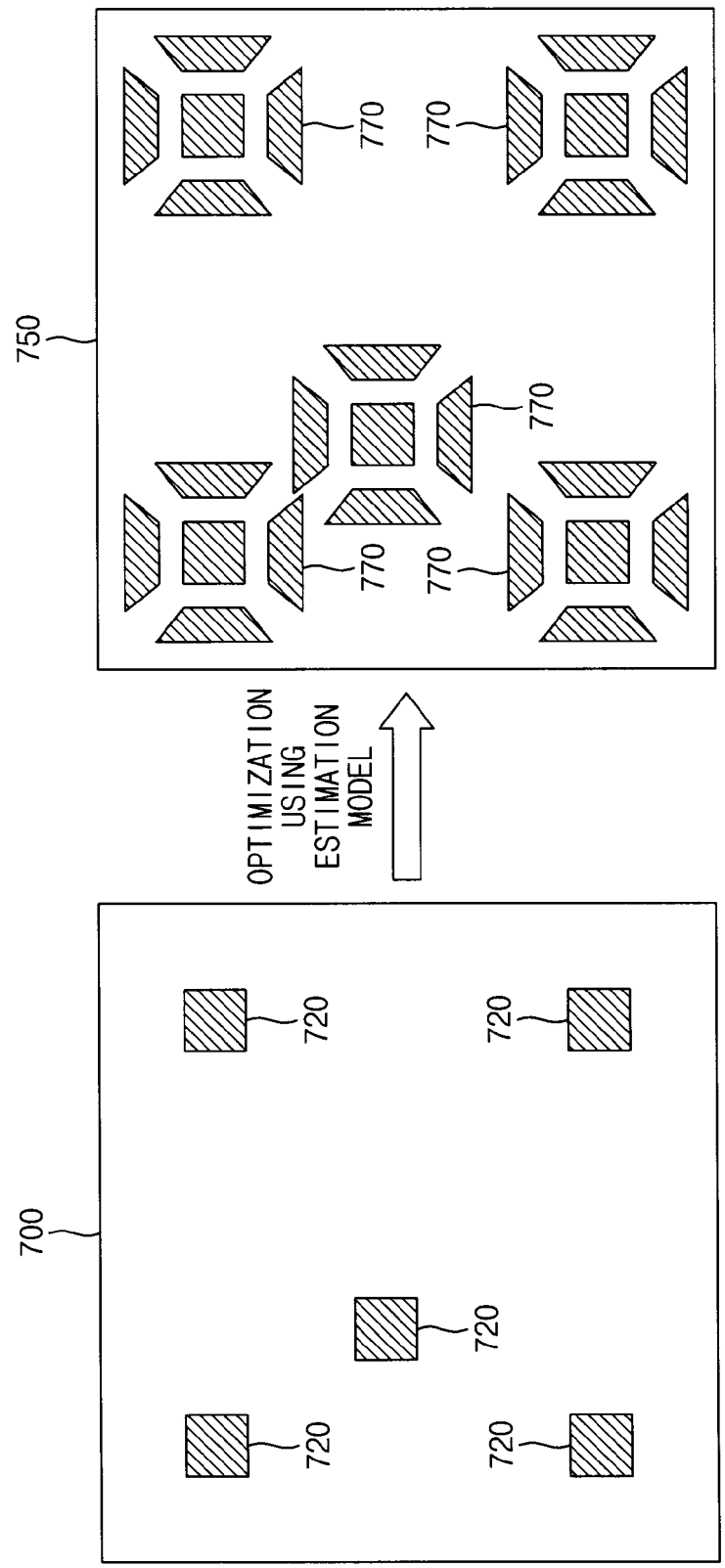
FIG. 8 is a view illustrating an example of a mask optimization method performed on a target mask in the mask optimization method of FIG. 4 according to example embodiments.

FIG. 4 is a flow chart illustrating a mask optimization method according to example embodiments. FIG. 5 is a view illustrating an example of a mask optimization method performed on a sample mask in the mask optimization method of FIG. 4 according to example embodiments. FIG. 6 is a view illustrating another example of a mask optimization method performed on a sample mask in the mask optimization method of FIG. 4 according to example embodiments. FIG. 7 is a view illustrating a pixel-based learning performed in the mask optimization method of FIG. 4 according to example embodiments. FIG. 8 is a view illustrating an example of a mask optimization method performed on a target mask in the mask optimization method of FIG. 4 according to example embodiments.

Referring to FIG. 4, in a mask optimization method for optimizing a target mask used for a partial coherent system having a plurality of spatial filters, in operation S310, a trainer mask that is an optimized sample mask may be obtained by performing a mask optimization on a sample mask. The optimization of the sample mask may be performed by a resolution enhancement technique. In some embodiments, the resolution enhancement technique for the optimization of the sample mask may include, for example, optical proximity correction, an assist feature method or inverse lithography technique.

In some embodiments, referring to FIG. 5, a sample mask 400 including a first mask polygon 420 having a shape corresponding to an interconnection pattern may be optimized into a trainer mask 450 of which each segment includes a second mask polygon 470 having a bias with respect to the first mask polygon 420 before the optimization by the optical proximity correction. In the example of FIG. 5, two second mask polygons 470 are shown as having a bias with respect to two corresponding first mask polygons 420. In other embodiments, referring to FIG. 6, a sample mask 500 including a third mask polygon 520 having a shape corresponding to a contact pattern may be optimized into a trainer mask 550 including a fourth mask polygon 570 further including an assist feature or an assist pattern by the assist feature method. The mask optimization of the sample mask 400 and 500 as shown in FIGS. 5 and 6 may be exemplary. In some embodiments, the mask optimization on the sample mask may be performed by various methods.

The same mask may be an arbitrary mask including mask polygons corresponding to a representative circuit pattern of a circuit pattern (or a device circuit) to be formed by the partial coherent system. In some embodiments, the sample mask may be some of a plurality of masks used to fabricate one electronic circuit in the partial coherent system. For example, the mask optimization may be performed on the some of the plurality of masks by the resolution enhancement technique, and the mask optimization may be performed on the others of the plurality of masks as a target mask using a mask optimization estimation model generated by a pixel-based learning. In other embodiments, the sample mask may be a mask discretionally-generated by a designer based on a circuit pattern to be formed.

Referring to FIG. 4, in operation S320, the mask optimization estimation model may be generated by performing the pixel-based learning based on the trainer mask that is the sample mask optimized by the resolution enhancement technique. The pixel-based learning may be performed by dividing the trainer mask into a plurality of pixels, using partial signals of each pixel respectively determined based on the spatial filters in the partial coherent system as a feature vector of each pixel of the trainer mask, and using a degree of overlap between each pixel and the mask polygon of the trainer mask as a target value of each pixel. Herein, the pixel may be a unit area of the mask and may have a size proportional to a minimum resolution of an optical system (i.e., the partial coherent system).

For example, a feature vector of a k-th pixel of the trainer mask may be calculated using the following Equation 2 and Equation 3.

$$q_k = [i_{k1}, i_{k2}, \ldots, i_{kn}] \quad \text{[Equation 2]}$$

$$i_{kj} = |O(x,y) \cdot \Phi_j(x,y)|^m @(x_k, y_k) \quad \text{[Equation 3]}$$

Herein, "$q_k$" may represent the feature vector of the k-th pixel, "$i_{kj}$" may represent a partial signal by a j-th point light source (or a j-th spatial filter) of the k-th pixel (e.g., $i_{k1}$, $i_{k2}$, ... $i_{kn}$), "$O(x,y)$" may represent a mask function of the sample mask (that is the trainer mask before optimization), and "$\Phi_j(x,y)$" may represent a spatial filter of the partial coherent system by the j-th point light source. The mask function "$O(x,y)$" of the sample mask may have a value "1" for a position in which a mask polygon of the sample mask is present and a value "0" for a position in which the mask polygon of the sample mask is not present, as a mathematical model representing an optical characteristic of the sample mask in the space domain. The j-th spatial filter "$\Phi_j(x,y)$" may be obtained by performing a Fourier transform on the pupil function representing the optical characteristic of the aperture of the partial coherent system by the j-th point light source in the partial coherent system in the space domain. Further, "$(x_k, y_k)$" may represent a coordinate of the k-th pixel, "n" may correspond to the number of the point light sources of the partial coherent system as the number of the spatial filters of the partial coherent system, and "m" may be a number determined by a designer to derive an accurate mask optimization estimation model.

As shown in the Equation 2, the feature vector of the k-th pixel, "$q_k$" may include partial signals "$i_{k1}$" through "$i_{kn}$" corresponding to the spatial filters of the partial coherent system. As shown in the Equation 3, each partial signal "$i_{kj}$" may be calculated by performing a convolution operation of a corresponding one "$\Phi_j(x,y)$" of the partial filters and the mask function "$O(x,y)$" of the sample mask. When "m" is 1, each partial signal "$i_{kj}$" may physically represent an optical field of a corresponding point light source (i.e., the j-th point light source). When "m" is 2, each partial signal "$i_{kj}$" may physically represent a basis intensity of the corresponding point light source (i.e., the j-th point light source) as the square of the optical field. The value "m" may be determined by the designer to derive the accurate mask optimization estimation model.

As described above, as the feature vector of the k-th pixel of the trainer mask includes the partial signals respectively corresponding to the spatial filters of the partial coherent system, the mask optimization estimation model generated using the feature vector may more closely reflect the optical characteristic of the partial coherent system, and thus performance of the mask optimization estimation model may be enhanced.

The pixel-based learning using the trainer mask may be performed using an arbitrary machine learning. For example, the pixel-based learning may be performed using a linear learning, a non-linear learning or a neural network learning.

In some embodiments, referring to FIG. 7, the pixel-based learning may be performed by a supervised learning method of the neural network learning. For example, when the feature vector "$q_k$" of each pixel of the trainer mask is inputted to a mask optimization estimation model 600, the mask optimization estimation model 600 may output an output value (e.g., an estimated grey scale value "$f(q_k, PS)$") corresponding to the feature vector "$q_k$". The output value may be compared to the degree of overlap (e.g., a grey scale value) between each pixel and the mask polygon of the trainer mask, which is a target value "$gr_k$" of each pixel. A difference 620 between the output value "$f(q_k, PS)$" of the mask optimization estimation model 600 and the target value "$gr_k$" may be reflected to the mask optimization estimation model 600 as an error value "$e_k$". Such learning may be performed to derive a parameter set PS (e.g., a weight value) of the mask optimization estimation model 600 to minimize the error value "$e_k$". For example, the pixel-based learning may be performed to minimize the following Equation 4.

$$\Sigma |gr_k - f(q_k, PS)|^l \quad \text{[Equation 4]}$$

Herein, the target value "$gr_k$" may represent the degree of overlap between each pixel and the mask polygon of the trainer mask, and "$f(q_k, PS)$" may represent the output value of the mask optimization estimation model 600 when "$gr_k$" is inputted. "l" may be a value determined by the designer, for example, 1 or 2, but is not limited thereto. The mask optimization estimation model 600 may be learned such that the difference between the target value "$gr_k$" of each pixel and the output value (e.g., the estimated grey scale value "$f(q_k, PS)$") outputted from the mask optimization estimation model 600 when the feature vector "$q_k$" of each pixel is inputted to the mask optimization estimation model 600, may be minimized.

In some embodiments, the mask optimization estimation model 600 may be generated for each type of circuit or element included in an electronic circuit fabricated using the partial coherent system. For example, the mask optimization estimation model 600 may be generated for a contact pattern, an interconnection pattern or a gate pattern of the electronic circuit.

The mask optimization estimation model 600 may output the degree of overlap between each pixel and the mask polygon of the optimized mask when the feature vector "$q_k$" of each pixel of the mask before the optimization thereof is inputted.

Referring to FIG. 4, in operation S370, a mask optimization may be performed on the target mask using the mask optimization estimation model 600 of FIG. 7. In some embodiments, to perform the mask optimization on the target mask using the mask optimization estimation model 600, for each pixel, a feature vector of the pixel of the target mask may be obtained, a degree of overlap between the pixel and a mask polygon of the optimized target mask may be obtained by inputting the feature vector of the pixel of the target mask to the mask optimization estimation model 600, and a presence or absence of a mask polygon in the pixel may be determined according to the obtained degree of overlap.

For example, referring to FIG. 8, a feature vector of each pixel of a target mask 700 including a fifth mask polygon 720 may be extracted. The feature vector of each pixel may be extracted based on a convolution operation of a mask function of the target mask 700 and each corresponding spatial filter of the partial coherent system. Additionally, when the feature vector of each pixel of the target mask 700 is inputted to the mask optimization estimation model 600 of FIG. 7, the mask optimization estimation model 600 may output a degree of overlap of a sixth mask polygon 770 of the optimized target mask 750 with respect to each of the pixels. A presence or absence of the sixth mask polygon 770 at each of the pixels may be determined based on the degree of overlap outputted from the mask optimization estimation model 600. The optimized target mask 750 including the sixth mask polygon 770 may be generated when the pixels at which the presence or absence of the sixth mask polygon 770 is determined are combined. The target mask 700 may not be optimized by the resolution enhancement technique but may be optimized using the mask optimization estimation model 600 generated through the pixel-based learning, and thus the target mask 700 may be quickly and efficiently optimized compared to the resolution enhancement technique described above. Additionally, the target mask 750 optimized using the mask optimization estimation model 600 may be similar to the trainer mask 550 of FIG. 6 optimized by the resolution enhancement technique. A performance of the mask optimization using the mask optimization estimation model 600 may be similar to a performance of the mask optimization by the resolution enhancement technique.

As described above, in the mask optimization method according to example embodiments, the mask optimization estimation model 600 may be generated by performing the pixel-based learning using the trainer mask 550 on which the mask optimization is performed, and the target mask 700 may be quickly and efficiently optimized by performing the mask optimization on the target mask 700 using the mask optimization estimation model 600. Additionally, in the mask optimization method according to example embodiments, the partial signals "$i_j$" respectively corresponding to the spatial filters of the partial coherent system may be extracted as the feature vector "$q_k$" for each pixel of the trainer mask 550, and the pixel-based learning may be performed to generate the mask optimization estimation model 600. Thus, the mask optimization estimation model 600 may be generated by reflecting the optical characteristic of the partial coherent system, and the mask optimization may be performed on the target mask 700.

Figure 9:
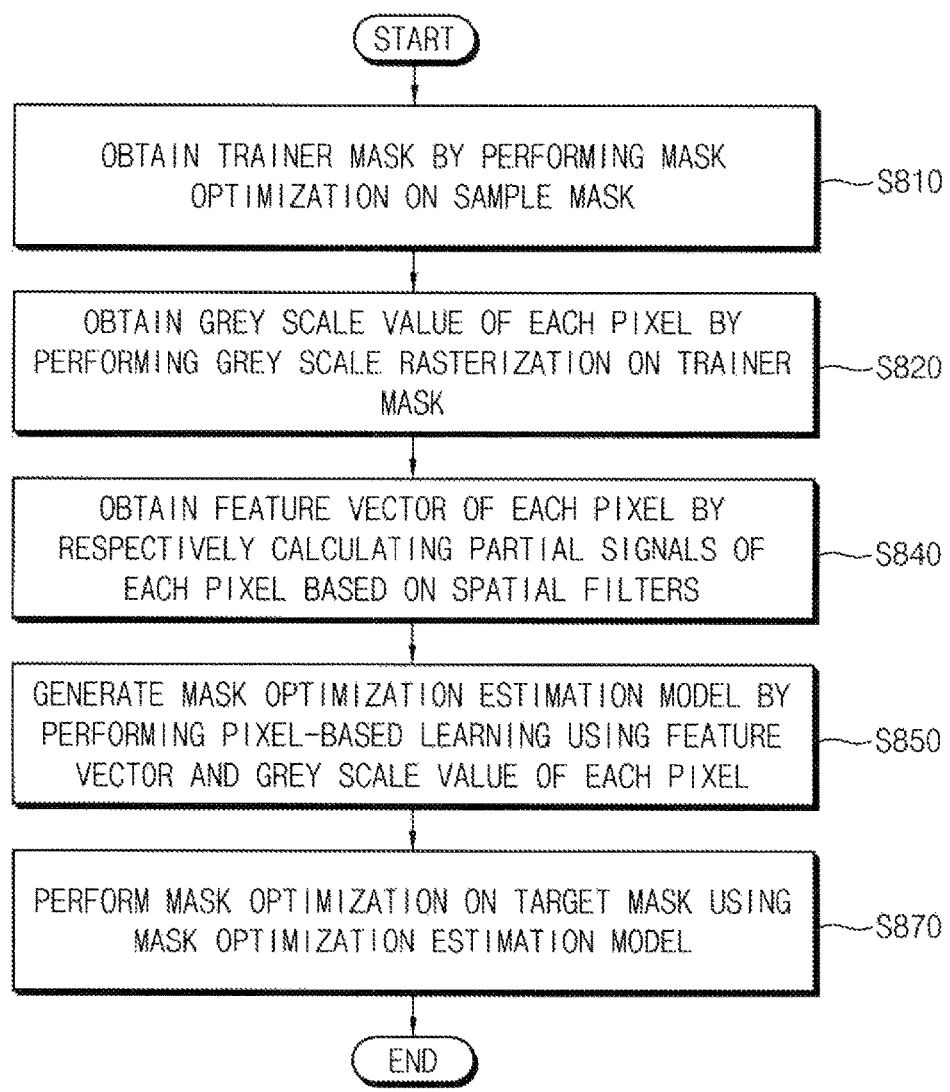
FIG. 9 is a flow chart illustrating a mask optimization method according to example embodiments.
Figure 10:
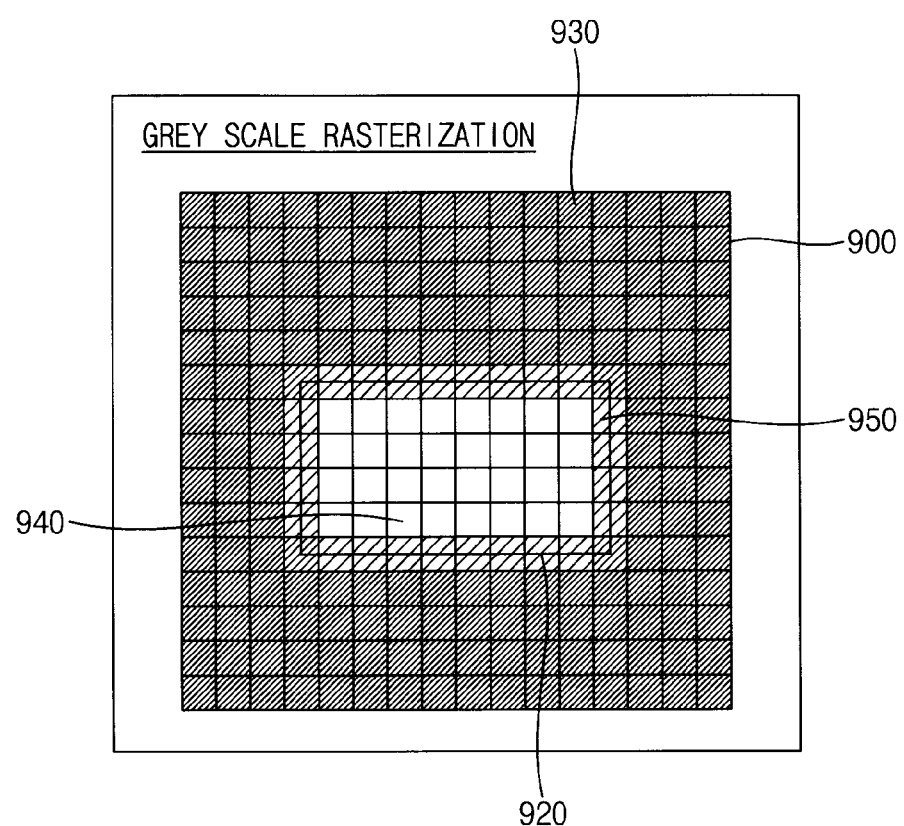
FIG. 10 is a view illustrating a grey-scale rasterization performed in the mask optimization method of FIG. 9 according to example embodiments.

FIG. 9 is a flow chart illustrating a mask optimization method according to example embodiments. FIG. 10 is a view illustrating a grey scale rasterization performed in the mask optimization method of FIG. 9 according to example embodiments.

Referring to FIG. 9, in operation S810, a trainer mask that is an optimized sample mask may be obtained by performing a mask optimization on a sample mask. In operation S820, a gray scale value of each pixel of the trainer mask representing a degree of overlap of a mask polygon of the trainer mask with respect to a corresponding pixel of the trainer mask may be obtained by performing a gray scale rasterization on the trainer mask.

For example, referring to FIG. 10, a trainer mask 900 may be divided into a plurality of first through third pixels 930, 940 and 950. A gray scale rasterization may be performed on the trainer mask 900 such that the first pixel 930 non-overlapped with a mask polygon 920 of the trainer mask 900 may have a gray scale value "0", the second pixel 940 entirely overlapped with the mask polygon 920 of the trainer mask 900 may have a gray scale value "1", and the third pixel 950 partially overlapped with the mask polygon 920 of the trainer mask 900 may have a gray scale value between "0" and "1" proportional to a size of the overlapped portion thereof.

Referring to FIG. 9, in operation S840, a feature vector including the partial signals of each pixel of the trainer mask may be obtained by respectively calculating partial signals of each pixel of the trainer mask based on the spatial filters of the partial coherent system. In operation S850, a pixel-based learning may be performed using the feature vector of each pixel of the trainer mask and using the gray scale value of each pixel of the trainer mask as a target value of each pixel of the trainer mask, such that a mask optimization estimation model may be generated.

In operation S870, a mask optimization for a target mask may be performed using the mask optimization estimation model. Thus, the mask optimization for the target mask may be quickly and efficiently performed compared.

Figure 11:
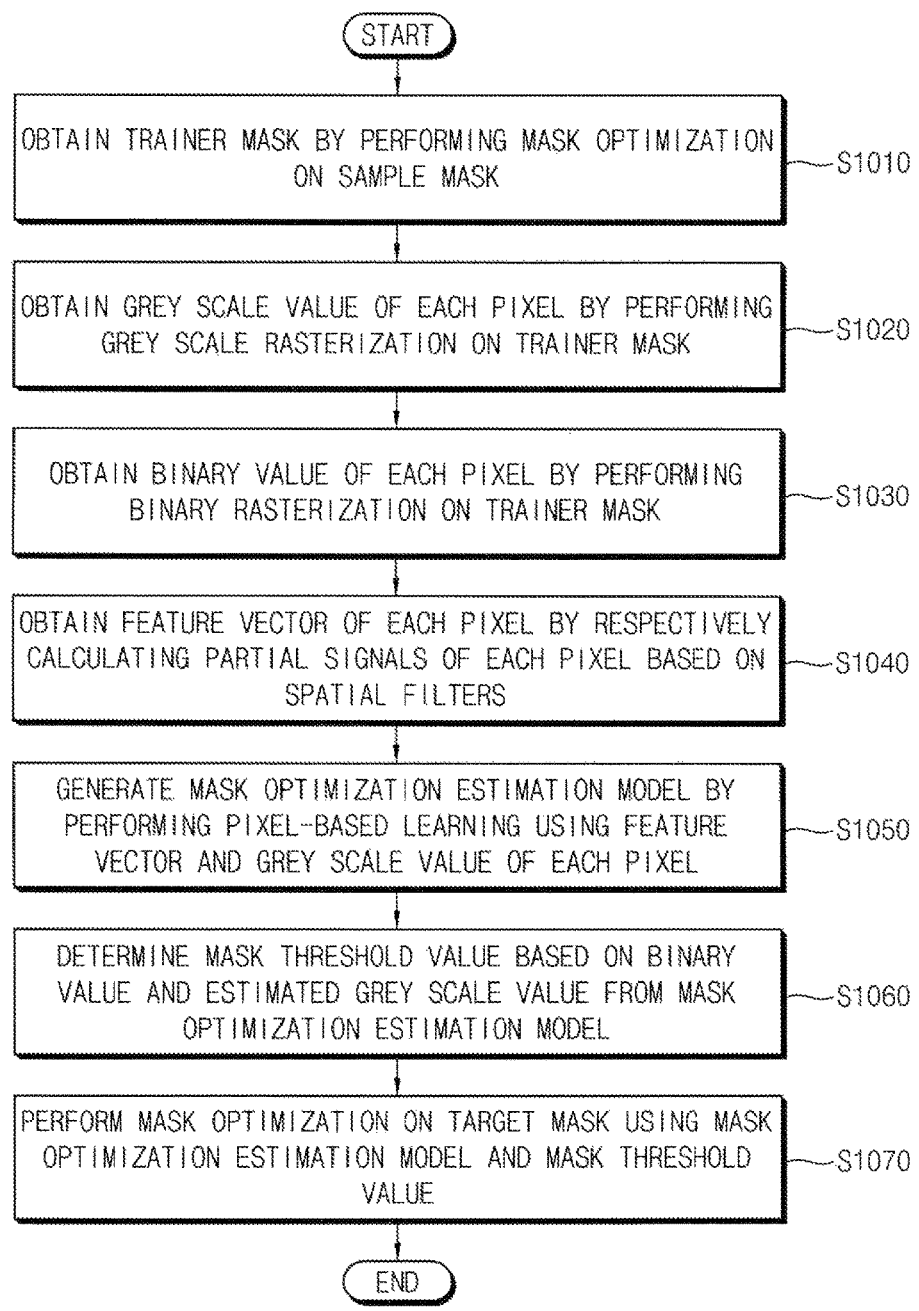
FIG. 11 is a flow chart illustrating a mask optimization method according to example embodiments.
Figure 12:
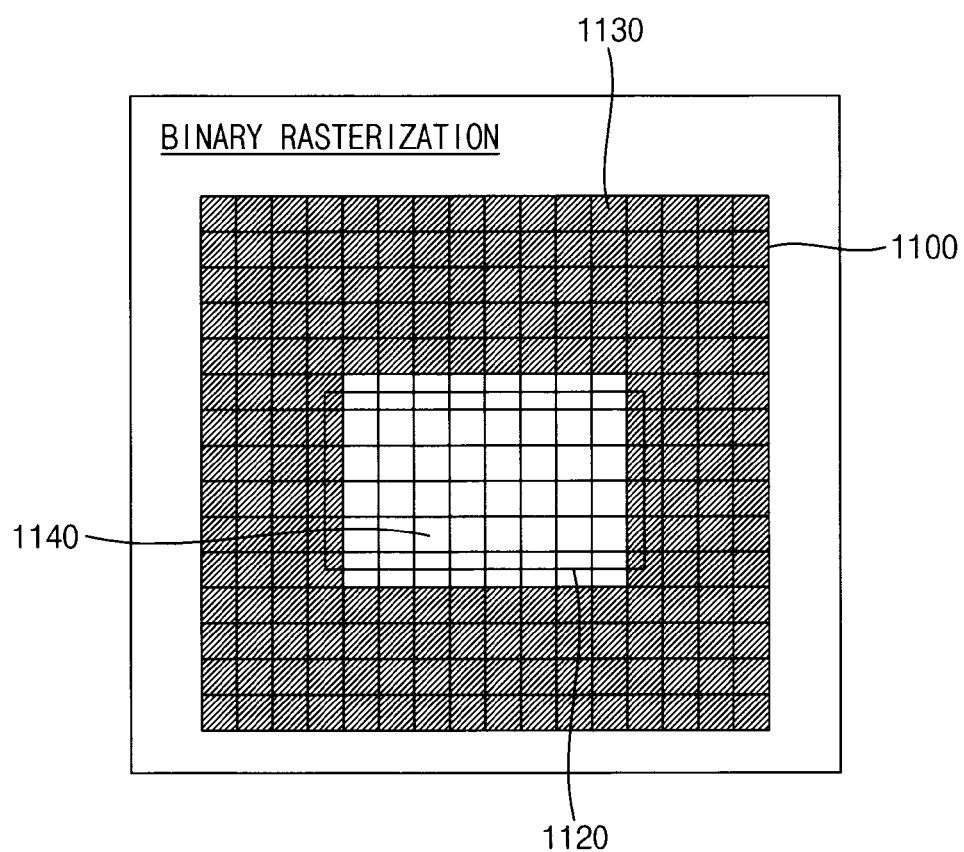
FIG. 12 is a view illustrating a binary rasterization performed in the mask optimization method of FIG. 11 according to example embodiments.

FIG. 11 is a flow chart illustrating a mask optimization method according to example embodiments. FIG. 12 is a view illustrating a binary rasterization performed in the mask optimization method of FIG. 11 according to example embodiments.

Referring to FIG. 11, in operation S1010, a trainer mask may be obtained by performing a mask optimization on a sample mask. In operation S1020, a grey scale value of each pixel of the trainer mask may be obtained by performing a grey scale rasterization on the trainer mask. In operation S1030, a binary value of each pixel of the trainer mask may be obtained by performing a binary rasterization on the trainer mask.

In some embodiments, referring to FIG. 12, a trainer mask 1100 may be divided into a plurality of third and fourth pixels 1130 and 1140. A binary rasterization may be performed on the trainer mask 1100 such that the third pixel 1130 having a central point that is not overlapped with a mask polygon 1120 of the trainer mask 1100 may have a binary value "0" and the fourth pixel 1140 having a central point that is overlapped with the mask polygon 1120 of the trainer mask 1100 may have a binary value "1".

Referring to FIG. 11, a feature vector of each pixel of the trainer mask may be obtained by respectively calculating the partial signals of each pixel based on spatial filers of the partial coherent system, in operation S1040, and a pixel-based learning using the feature vector and the grey scale value may be performed such that a mask optimization estimation model may generated, in operation S1050. In operation S1060, when the feature vector is inputted to the mask optimization estimation model, a mask threshold value may be determined based on an estimated grey scale value outputted from the mask optimization estimation model and the binary value of each pixel. In some embodiments, the mask threshold value may be determined to minimize a sum of the number of the pixels each having the estimated grey scale value that is smaller than the mask threshold value when the binary value is "1" and the number of the pixels each having the estimated grey scale value that is greater than the mask threshold value when the binary value is "0". The pixels each having the estimated grey scale value that is smaller than the mask threshold value may mean when the estimated grey scale value that is smaller than mask threshold value is outputted although it is desired to determine that a mask polygon exists for the pixel, and the pixels each having the estimated grey scale value that is greater than the mask threshold value may mean when the estimated grey scale value that is greater than mask threshold value is outputted although it is desired to determine that the mask polygon does not exist for the pixel.

In operation S1070, a mask optimization for a target mask may be performed using the generated mask optimization estimation model and the mask threshold value. For example, a feature vector of each pixel of the target mask may be extracted, and the feature vector may be inputted to the mask optimization estimation model such that the estimated grey scale value may be obtained. The estimated grey scale value may be compared to the mask threshold value such that it is determined whether the mask polygon is present or not at each pixel of the target mask that is optimized. By combining the pixels at which the presence or absence of the mask polygon is determined, the optimized target mask may be generated using the mask optimization estimation model. Thus, the mask optimization for the target mask may be quickly and efficiently performed.

Figure 13:
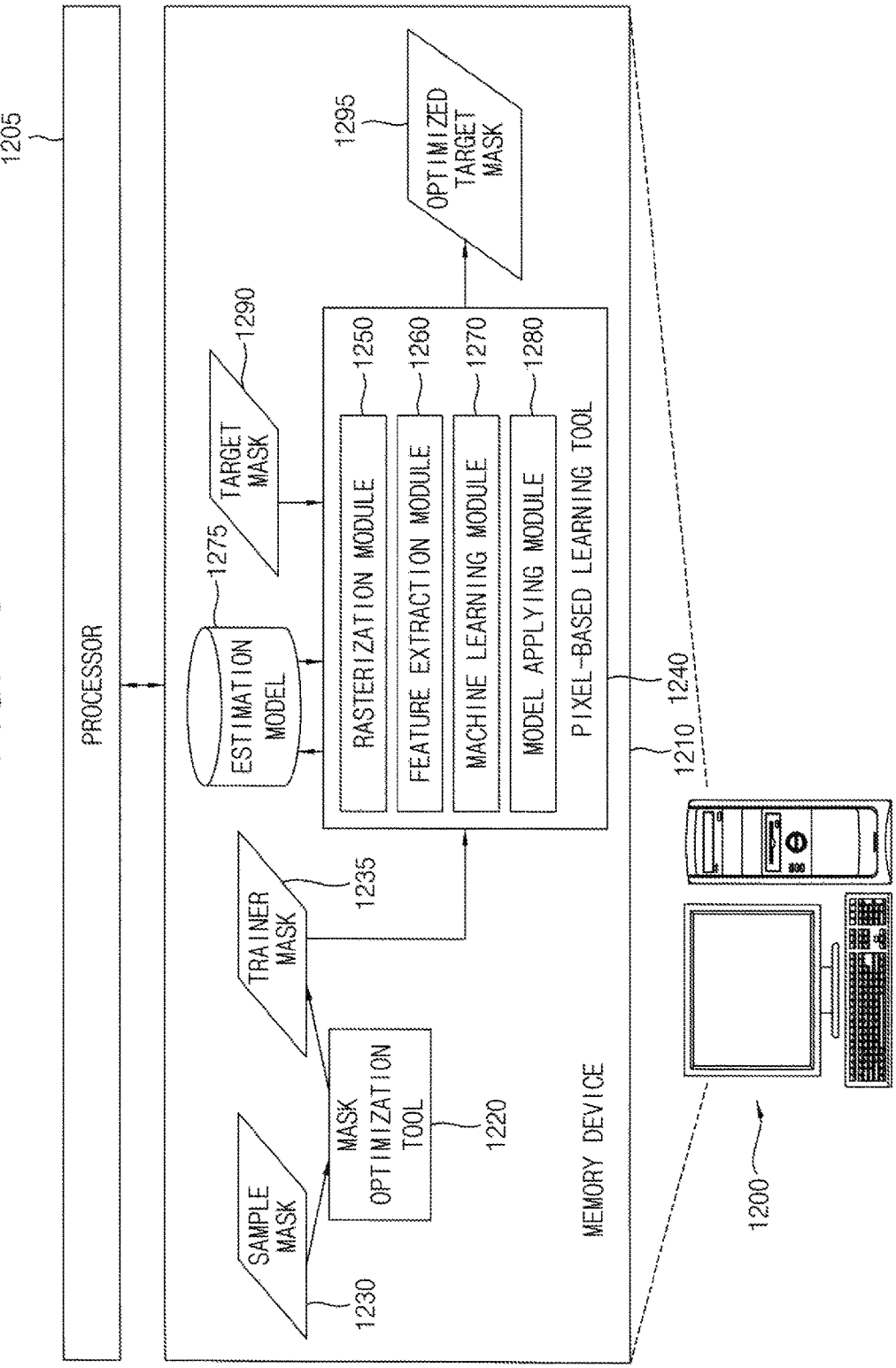
FIG. 13 is a view illustrating a computing system performing a mask optimization method according to example embodiments.

FIG. 13 is a view illustrating a computing system performing a mask optimization method according to example embodiments.

Referring to FIG. 13, a computing system 1200 performing a mask optimization method may include a processor 1205 and a memory device 1210. The processor 1205 may load a sample mask data 1230 and a mask optimization tool 1220 in the memory device 1210. The mask optimization tool 1220 may be a tool performing a mask optimization by a resolution enhancement technique. The mask optimization tool 1220 may perform the mask optimization on the sample mask data 1230 such that a trainer mask data 1235 may be generated.

The processor 1205 may load a pixel-based learning tool 1240 in the memory device 1210. The pixel-based learning tool 1240 may include a rasterization module 1250, a feature extraction module 1260, a machine learning module 1270 and a model application module 1280. The rasterization module 1250 may obtain a grey scale value and a binary value of each pixel of a trainer mask by performing a grey scale rasterization and a binary rasterization on the trainer mask data 1235. The feature extraction module 1260 may respectively calculate partial signals of each pixel of the trainer mask based on spatial filters of a partial coherent system in which a mask are used and may obtain a feature vector of each pixel including the partial signals. The machine learning module 1270 may generate a mask optimization estimation model 1275 by performing the pixel-based learning using the feature vector of each pixel and using the grey scale value of each pixel as a target value of each pixel. Additionally, the machine learning module 1270 may determine a mask threshold value based on the binary value of each pixel and an estimated grey scale value outputted from the mask optimization estimation model 1275 when the feature vector of each pixel is inputted to the mask optimization estimation model 1275. The processor 1205 may load a target mask data 1290. The model application module 1280 may generate an optimized target mask data 1295 by performing the mask optimization on the target mask data 1290 using the mask optimization estimation model 1275 and the mask threshold value.

The computing system 1200 performing the mask optimization method according to example embodiments may generate the mask optimization estimation model 1275 by performing the pixel-based learning using the trainer mask data 1235 on which the mask optimization is performed and may perform the mask optimization on a target mask data 1290 using the mask optimization estimation model 1275 to quickly and efficiently optimize a target mask.

Figure 14:
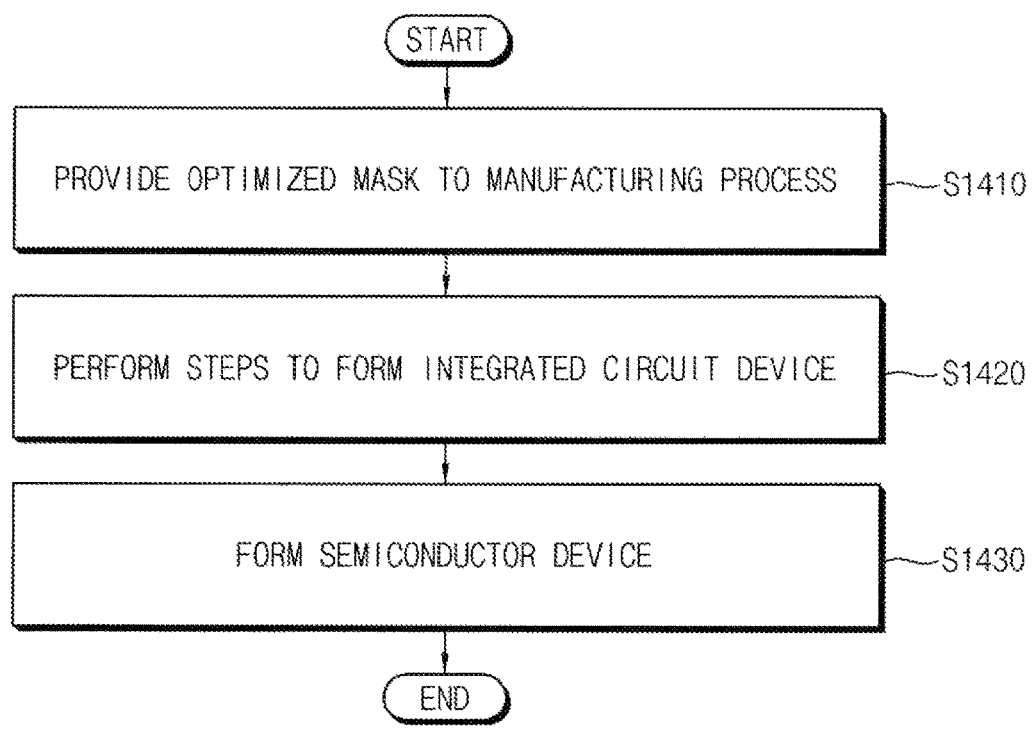
FIG. 14 depicts a method of manufacturing an integrated circuit device using a mask optimized using pixel-based learning according to example embodiments.

FIG. 14 illustrates a method of manufacturing an integrated circuit device using a mask optimized using pixel-based learning according to example embodiments. First, in step 1410, an optimized mask formed by the mask optimization method disclosed herein may be provided to a location where semiconductor manufacturing is performed. For example, the mask may be moved via a loading device (e.g., using an electro-mechanical device connected to a holder such as a hand-gripper, in a manner that allows the mask to be picked up and/or moved) into equipment that uses the mask for photolithography.

Next, in step 1420, the optimized mask may be used to perform a step in forming an integrated circuit device on a semiconductor wafer. For example, the mask may be placed in a chamber where a semiconductor wafer is disposed, and may be used for a photolithography process to form a pattern on the semiconductor wafer. Subsequently, additional steps may be performed on the semiconductor wafer, for example to form a semiconductor device (step 1430). For example, additional layers may be deposited and patterned by using the optimized mask, on the semiconductor wafer, to form semiconductor chips, the semiconductor chips may then be singulated, packaged on a package substrate, and encapsulated by an encapsulant to form a semiconductor device.

The above steps may be controlled by a control system including one or more computers and one or more electro-mechanical devices for moving a travelling part within a transferring apparatus. Also, though the above steps are described in a particular order, they need not occur in that order necessarily.

The mask optimization method according to the disclosed embodiments may be used to optimize the mask used for the partial coherent system. Accordingly, the mask optimization method according to the disclosed embodiments may be usefully used to optimize the mask for fabricating an electronic circuit for a memory device, an integrated circuit or a display device, using the partial coherent system.

While the concepts have been particularly shown and described with reference to example embodiments thereof, it will be understood by those of ordinary skill in the art that various changes in form and details may be made therein without departing from the spirit and scope of the present disclosure as defined by the following claims.

What is claimed is:

1. A method of manufacturing an integrated circuit device by optimizing a target mask used for a partial coherent system having a plurality of spatial filters, the method comprising:
    obtaining a trainer mask that is an optimized sample mask by performing a mask optimization on a sample mask;
    generating a mask optimization estimation model by performing a pixel-based learning using, as a feature vector of each of pixels of the trainer mask, partial signals of each of the pixels of the trainer mask respectively determined based on the plurality of spatial filters and using, as a target value, a degree of overlap between each of the pixels and a mask polygon of the trainer mask;
    performing a mask optimization on the target mask using the mask optimization estimation model to obtain an optimized target mask; and
    forming the integrated circuit device with a semiconductor wafer using the optimized target mask.

2. The method according to claim 1, wherein generating the mask optimization estimation model includes:
- obtaining a grey scale value of each of the pixels of the trainer mask representing the degree of overlap relative to each of the pixels of the trainer mask by performing a grey scale rasterization on the trainer mask;
- obtaining the feature vector of each of the pixels of the trainer mask including the partial signals of each of the pixels of the trainer mask by respectively calculating the partial signals of each of the pixels of the trainer mask based on the spatial filters; and
- performing the pixel-based learning using the feature vector of each of the pixels of the trainer mask and using the grey scale value of each of the pixels of the trainer mask as the target value of each of the pixels of the trainer mask.

3. The method according to claim 2, wherein the grey scale value is 0 when the mask polygon of the trainer mask is not overlapped with pixels of the trainer mask,
- wherein the grey scale value is 1 when the mask polygon of the trainer mask is entirely overlapped with the pixels of the trainer mask, and
- wherein the grey scale value is proportional to a size of an overlapped portion of the pixels when the mask polygon of the trainer mask is partially overlapped with each of the pixels of the trainer mask.

4. The method according to claim 2, wherein calculating each of the partial signals includes:
- performing a convolution operation of a mask function of the sample mask and a corresponding one of the plurality of spatial filters.

5. The method according to claim 4, wherein the mask function of the sample mask has a value 1 for a first position in which a mask polygon of the sample mask is present and a value 0 for a second position in which the mask polygon of the sample mask is not present, as a mathematical model representing an optical characteristic of the sample mask in a space domain.

6. The method according to claim 4, wherein the plurality of spatial filters are obtained by performing a Fourier transform of pupil functions respectively representing optical characteristics of an aperture included in the partial coherent system by a plurality of point light sources included in the partial coherent system in a space domain.

7. The method according to claim 2, wherein performing the pixel-based learning includes:
- learning the mask optimization estimation model to minimize a difference between the grey scale value of each of the pixels of the trainer mask and an estimated grey scale value outputted from the mask optimization estimation model when the feature vector of each of the pixels of the trainer mask is inputted to the mask optimization estimation model.

8. The method according to claim 1, further comprising obtaining a binary value of each of the pixels of the trainer mask by performing a binary rasterization on the trainer mask.

9. The method according to claim 8, wherein the binary value is 0 when the mask polygon of the trainer mask is not overlapped with a central point of a respective pixel of the pixels, and wherein the binary value is 1 when the mask polygon of the trainer mask is overlapped with the central point of the respective pixel of the pixels.

10. The method according to claim 8, further comprising:
- determining a mask threshold value based on the binary value of each of the pixels of the trainer mask and an estimated grey scale value outputted from the mask optimization estimation model when the feature vector of each of the pixels of the trainer mask is inputted to the mask optimization estimation model.

11. The method according to claim 10, wherein the mask threshold value is determined to minimize a sum of a number of the pixels each of which has the estimated grey scale value that is smaller than the mask threshold value when the binary value is 1 and the number of the pixels each of which has the estimated grey scale value that is greater than the mask threshold value when the binary value is 0.

12. The method according to claim 10, wherein performing the mask optimization on the target mask includes:
- obtaining the feature vector of each of the pixels of the target mask;
- obtaining an estimated grey scale value of each of the pixels of the target mask by inputting the feature vector of each of the pixels of the target mask to the mask optimization estimation model; and
- determining presence or absence of the mask polygon at each of pixels of the optimized target mask by comparing the estimated grey scale value with the mask threshold value.

13. The method according to claim 1, wherein the mask optimization performed on the sample mask is performed using optical proximity correction, an assist feature method or an inverse lithography technique.

14. The method according to claim 1, wherein the sample mask is some of a plurality of masks used for fabricating at least one electronic circuit in the partial coherent system, and the target mask is others of the plurality of masks.

15. A method of manufacturing an integrated circuit device by optimizing a target mask used for a partial coherent system having a plurality of spatial filters, the method comprising:
- obtaining a trainer mask that is an optimized sample mask by performing a mask optimization on a sample mask;
- obtaining a grey scale value of each of pixels of the trainer mask representing a degree of overlap between a mask polygon of the trainer mask and each of the pixels of the trainer mask by performing a grey scale rasterization on the trainer mask;
- obtaining a feature vector of each of the pixels of the trainer mask by calculating partial signals of each of the pixels of the trainer mask based on the plurality of spatial filters;
- generating a mask optimization estimation model by performing a pixel-based learning using the feature vector of each of the pixels of the trainer mask and using the grey scale value of each of the pixels of the trainer mask as a target value of each of the pixels of the trainer mask;
- performing a mask optimization on the target mask using the mask optimization estimation model to obtain an optimized target mask; and
- forming the integrated circuit device with a semiconductor wafer using the optimized target mask.

16. A method of manufacturing an integrated circuit device by optimizing a target mask used for a partial coherent system having a plurality of spatial filters, the method comprising:
- obtaining a trainer mask by performing a mask optimization on a sample mask;
- obtaining a grey scale value for each pixel of the trainer mask, wherein the grey scale value represents a degree of overlap between a mask polygon of the trainer mask and the pixel of the trainer mask;

obtaining, for each pixel of the trainer mask, a feature vector of the pixel by calculating a partial signal of the pixel based on a corresponding one of the plurality of spatial filters;

generating a mask optimization estimation model by performing, for each pixel of the trainer mask, a pixel-based learning using the partial signal of the pixel as a feature vector and the grey scale value of the pixel as a target value;

performing a mask optimization on the target mask using the mask optimization estimation model to obtain an optimized target mask; and forming the integrated circuit device with a semiconductor wafer using the optimized target mask.

17. The method according to claim 16, wherein the grey scale value is 0 when the mask polygon of the trainer mask is not overlapped with the pixel, wherein the grey scale value is 1 when the mask polygon of the trainer mask is entirely overlapped with the pixel, and wherein the grey scale value is proportional to a size of an overlapped portion of the pixel when the mask polygon of the trainer mask is partially overlapped with the pixel.

18. The method according to claim 16, wherein calculating the partial signal includes:

performing a convolution operation of a mask function of the sample mask and the corresponding one of the plurality of spatial filters, wherein the mask function is a mathematical model representing an optical characteristic of the sample mask in a space domain.

19. The method according to claim 18, wherein a value of the mask function of the sample mask is 1 when a mask polygon of the sample mask is present, and wherein the value of the mask function of the sample mask is 1 when the mask polygon of the sample mask is not present.

20. The method according to claim 18, wherein the plurality of spatial filters are obtained by performing a Fourier transform of pupil functions respectively representing optical characteristics of an aperture included in the partial coherent system by a plurality of point light sources included in the partial coherent system in the space domain.

* * * * *